United States Patent
Lee et al.

(10) Patent No.: US 9,578,629 B2
(45) Date of Patent: Feb. 21, 2017

(54) METHOD AND APPARATUS OF CONTROLLING UPLINK TRANSMISSION IN A WIRELESS COMMUNICATION SYSTEM

(71) Applicant: LG ELECTRONICS INC., Seoul (KR)

(72) Inventors: Sunyoung Lee, Anyang-si (KR); Seungjune Yi, Anyang-si (KR); Sungjun Park, Anyang-si (KR); Youngdae Lee, Anyang-si (KR); Sunghoon Jung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 65 days.

(21) Appl. No.: 14/385,943

(22) PCT Filed: May 10, 2013

(86) PCT No.: PCT/KR2013/004138
§ 371 (c)(1),
(2) Date: Sep. 17, 2014

(87) PCT Pub. No.: WO2013/169057
PCT Pub. Date: Nov. 14, 2013

(65) Prior Publication Data
US 2015/0098400 A1    Apr. 9, 2015

Related U.S. Application Data

(60) Provisional application No. 61/645,603, filed on May 10, 2012.

(51) Int. Cl.
*H04W 4/00*     (2009.01)
*H04W 72/04*    (2009.01)
(Continued)

(52) U.S. Cl.
CPC ...... *H04W 72/0413* (2013.01); *H04J 11/005* (2013.01); *H04W 56/0045* (2013.01)

(58) Field of Classification Search
CPC .................................................. H04W 72/0413
See application file for complete search history.

(56) References Cited

U.S. PATENT DOCUMENTS

2012/0008600 A1    1/2012  Marinier et al.
2012/0257570 A1*  10/2012  Jang ................ H04L 5/001
                                                   370/328
(Continued)

OTHER PUBLICATIONS

HTC, "Handling of RA procedure on an SCell when PCell TAT expires," 3GPP TSG-RAN WG2 Meeting #77bis, R2-121562, Mar. 2012, 3 pages.

(Continued)

*Primary Examiner* — Chi H Pham
*Assistant Examiner* — Fahmida Chowdhury
(74) *Attorney, Agent, or Firm* — Lee Hong Degerman Kang Waimey

(57) ABSTRACT

The present invention is directed to a method and an apparatus used for in a wireless communication system. Specifically, the present invention is directed to a method of controlling uplink transmission and an apparatus therefore, in which the method comprises: receiving a signal including information related with an assignment of a TAG for SCell; and considering SCell as having no valid uplink timing if TAT of the TAG is not running.

14 Claims, 15 Drawing Sheets

(51) Int. Cl.
*H04J 11/00* (2006.01)
*H04W 56/00* (2009.01)

(56) References Cited

U.S. PATENT DOCUMENTS

2012/0257601 A1* 10/2012 Kim .................. H04L 5/001
370/336
2013/0188473 A1* 7/2013 Dinan ............... H04W 56/0005
370/216
2015/0319786 A1* 11/2015 Dinan ................ H04W 56/001
370/329

OTHER PUBLICATIONS

ITRI, "Deactivation of Timing Reference SCell in sTAG," 3GPP TSG-RAN WG2 Meeting #77bis, Tdoc R2-121530, Mar. 2012, 4 pages.
LG Electronics Inc., "TAT handling upon the removal of the last SCell in sTAG," 3GPP TSG-RAN WG2 #76, R2-116270, 1 page.
New Postcom, "Considerations on SCell-only TAG and corresponding TAT," 3GPP TSG RAN WG2 Meeting #76, R2-115740, Nov. 2011, 3 pages.
PCT International Application No. PCT/KR2013/004138, Written Opinion of the International Searching Authority dated Aug. 27, 2013, 1 page.

* cited by examiner

METHOD AND APPARATUS OF CONTROLLING UPLINK TRANSMISSION IN A WIRELESS COMMUNICATION SYSTEM

CROSS-REFERENCE TO RELATED APPLICATIONS

This application is the National Stage filing under 35 U.S.C. 371 of International Application No. PCT/KR2013/004138, filed on May 10, 2013, which claims the benefit of U.S. Provisional Application Ser. No. 61/645,603, filed on May 10, 2012, the contents of which are all hereby incorporated by reference herein in their entirety.

TECHNICAL FIELD

The present invention is directed to a method and an apparatus used for in a wireless communication system. Specifically, the present invention is directed to a method and an apparatus of controlling uplink transmission in a wireless communication system supporting Carrier Aggregation (CA).

BACKGROUND ART

A wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, etc.

DISCLOSURE

Technical Problem

An object of the present invention is to provide a method and an apparatus of efficiently controlling cell activation in a wireless communication system.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

As an aspect of the invention, a method of controlling uplink transmission at a user equipment configured with plural cells in a wireless communication system is provided, in which the method comprises: receiving a signal including information related with an assignment of a Timing Advance Group (TAG) for a Secondary Cell (SCell); and considering the SCell as having no valid uplink timing if a Time Alignment Timer (TAT) of the TAG is not running.

As another aspect of the invention, a User Equipment (UE) configured to control uplink transmission in a wireless communication system is provided, in which the UE comprises: a radio frequency (RF) module; and a processor, wherein the processor is configured to: receive a signal including information related with an assignment of a Timing Advance Group (TAG) for a Secondary Cell (SCell); and consider the SCell as having no valid uplink timing if a Time Alignment Timer (TAT) of the TAG is not running.

Preferably, all Hybrid ARQ Repeat reQuest (HARQ) buffers may be flushed if the TAT of the TAG is not running.

Preferably, an upper layer may be notified to release Physical Uplink Control Channel (PUCCH) resource and Sounding Reference Signal (SRS) if the TAT of the TAG is not running.

Preferably, any configured downlink assignment and uplink grant may be cleared if the TAT of the TAG is not running.

Preferably, the signal may be a Radio Resource Control (RRC) signal or a Medium Access Control (MAC) signal.

Advantageous Effects

Exemplary embodiments of the present invention have the following effects. In accordance with the embodiments of the present invention, cell activation can be efficiently controlled in a wireless communication system.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

MODE FOR INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, Global System for Mobile communications (GSM), General Packet Radio Service (GPRS), Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of the Universal Mobile Telecommunications System (UMTS). 3rd Generation Partnership Project (3GPP) Long Term Evolution (LTE) is a part of Evolved UMTS (E-UMTS) that uses E-UTRA. The LTE-Advanced (LTE-A) is an evolved version of 3GPP LTE. Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto.

Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto. Specific terms used for the exemplary embodiments of the present invention are provided to aid in understanding of the present invention. These specific terms may be replaced with other terms within the scope and spirit of the present invention.

Figure 1:
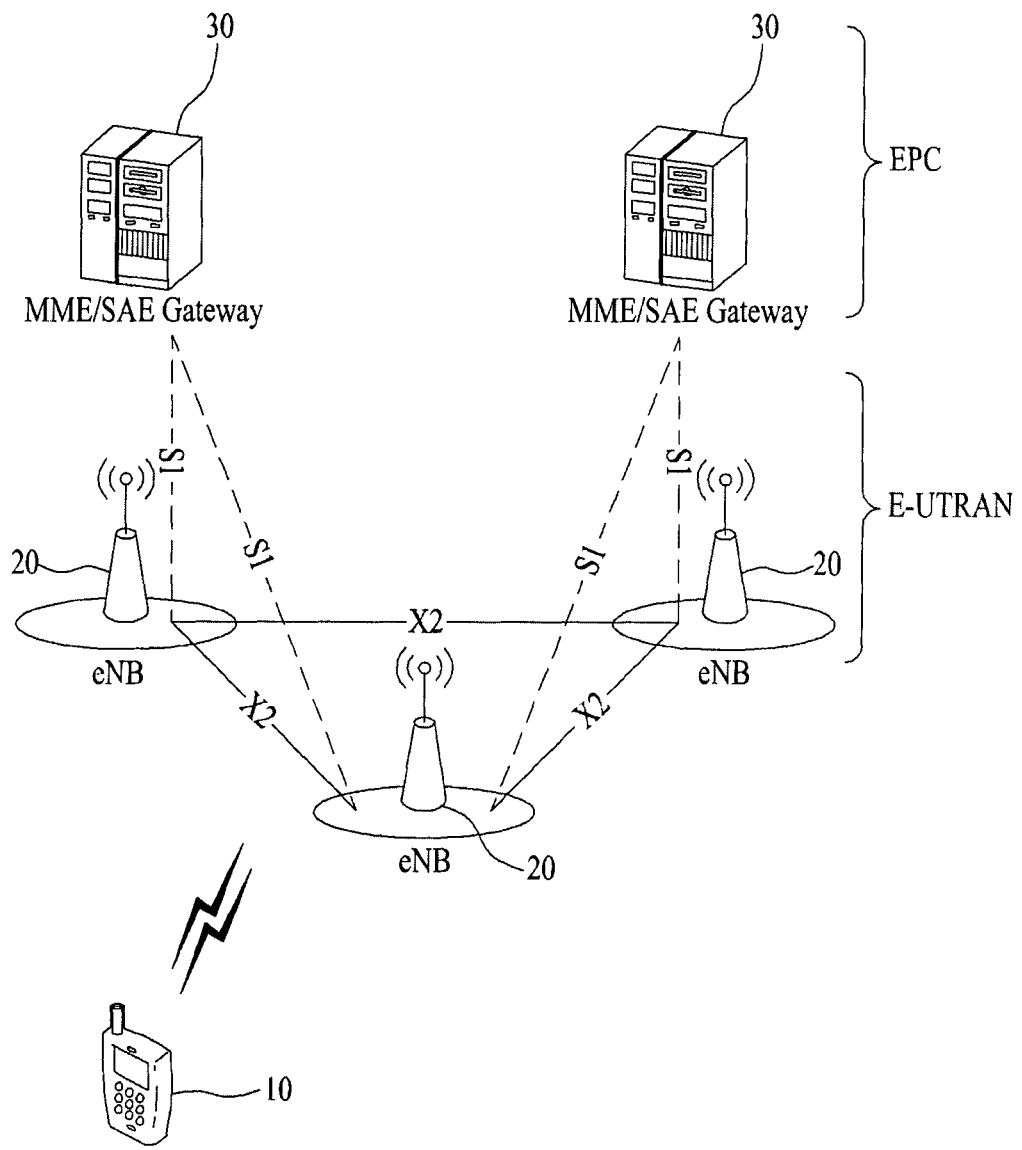
FIG. 1 illustrates a network structure of an Evolved Universal Mobile Telecommunication System (E-UMTS).

FIG. 1 illustrates a network structure of an E-UMTS. The E-UMTS may be also referred to as an LTE system. The E-UMTS is widely deployed to provide a variety of communication services such as voice and packet data, and is generally configured to function based upon the various techniques presented herein and discussed in more detail with regard to later figures.

With reference to FIG. 1, the E-UMTS network includes an Evolved UMTS Terrestrial Radio Access Network (E-UTRAN), an Evolved Packet Core (EPC), and one or more mobile terminals (or User Equipment (UE)) 10. The E-UTRAN includes one or more eNodeBs (eNBs) 20. Regarding the EPC, Mobility Management Entity/System Architecture Evolution (MME/SAE) gateway 30 provides an end point of a session and mobility management function for the UE 10. The eNB 20 and the MME/SAE gateway 30 may be connected via an S1 interface.

The UE 10 is a communication device carried by a user and may also be referred to as a Mobile Station (MS), a User Terminal (UT), a Subscriber Station (SS) or a wireless device. In general, the UE includes a Radio Frequency (RF) unit and a processor, among other components, and is configured to operate in accordance with the various techniques presented herein.

The eNB 20 is generally a fixed station that communicates with the UE 10. In addition to being referred to as a base station or an access point. An eNB 20 provides end points of a user plane and a control plane to the UE 10. In general, the eNB includes a Radio Frequency (RF) unit and a processor, among other components, and is configured to operate in accordance with the various techniques presented herein.

In terms of geometric view, a plurality of UEs 10 may be located in one cell in. One eNB 20 is typically deployed per cell. An interface for transmitting user traffic or control traffic may be used between eNBs 20. Here, "downLink (DL)" refers to communication from the eNB 20 to the UE 10, and "UpLink (UL)" refers to communication from the UE to the eNB.

The MME gateway 30 provides various functions including distribution of paging messages to eNBs 20, security control, idle state mobility control, SAE bearer control, and ciphering and integrity protection of Non-Access Stratum (NAS) signaling. The SAE gateway 30 provides assorted functions including termination of U-plane packets for paging reasons, and switching of the U-plane to support UE mobility.

A plurality of nodes may be connected between eNB 20 and gateway 30 via the S1 interface. The eNBs 20 may be connected to each other via an X2 interface and neighboring eNBs may have a meshed network structure that has the X2 interface.

Figure 2:
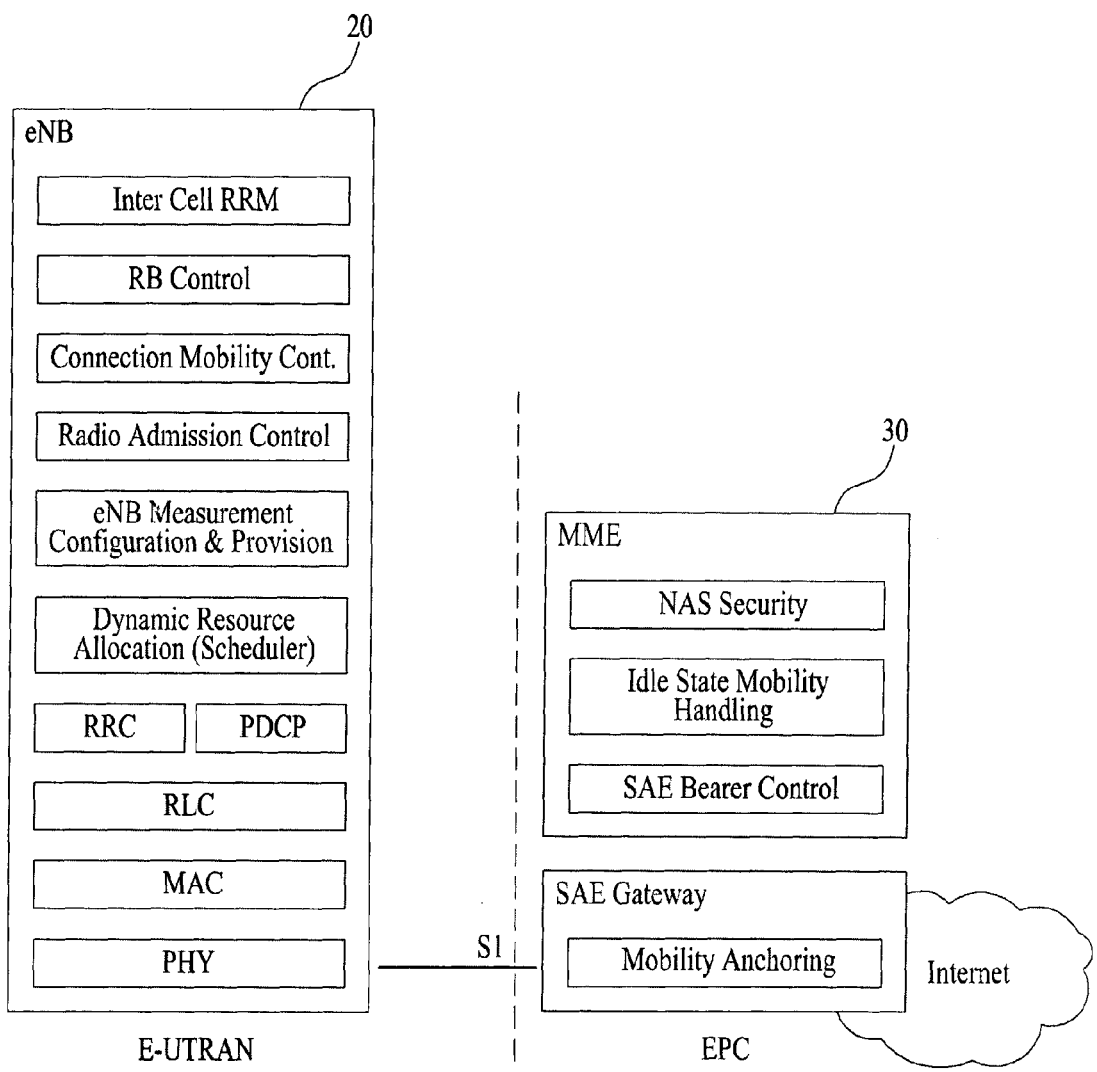
FIG. 2 illustrates a general structure of a typical E-UTRAN and that of a typical Evolved Packet Core (EPC).

FIG. 2 is a block diagram depicting general structures of an E-UTRAN and a EPC. With reference to FIG. 2, eNB 20 may perform functions of selection for MME/SAE gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, Radio Admission Control (RAC), and connection mobility control in LTE_ACTIVE state.

In the EPC, and as described above, MME/SAE gateway 30 may perform functions of paging origination, LTE-IDLE state management, ciphering of the user plane, SAE bearer control, and ciphering and integrity protection of NAS signaling.

Figure 3A:
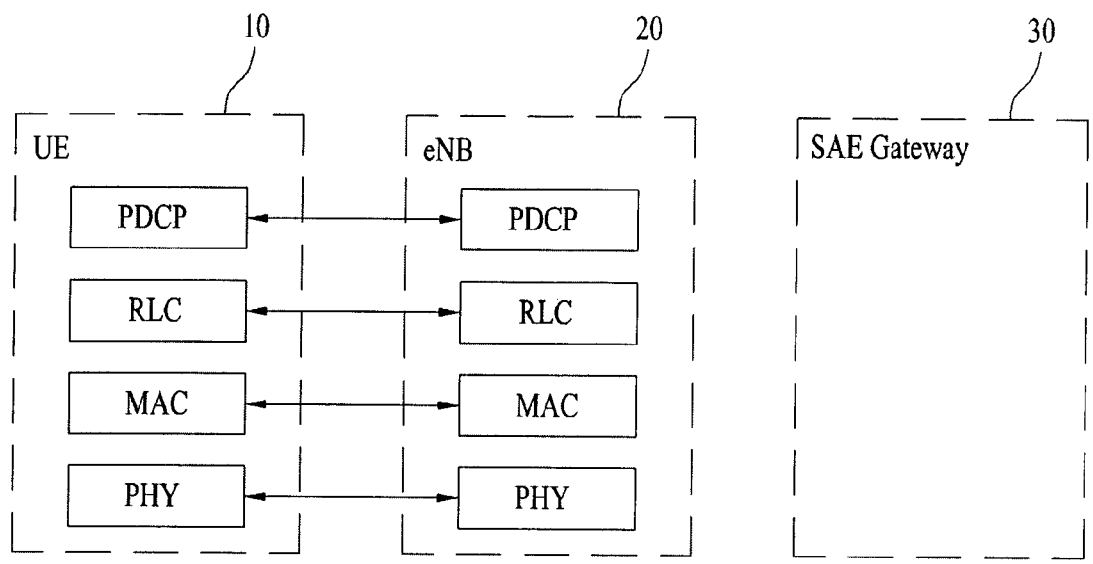
FIGS. 3a~3b illustrate a user-plane protocol and a control-plane protocol stack for the E-UMTS network
Figure 3B:
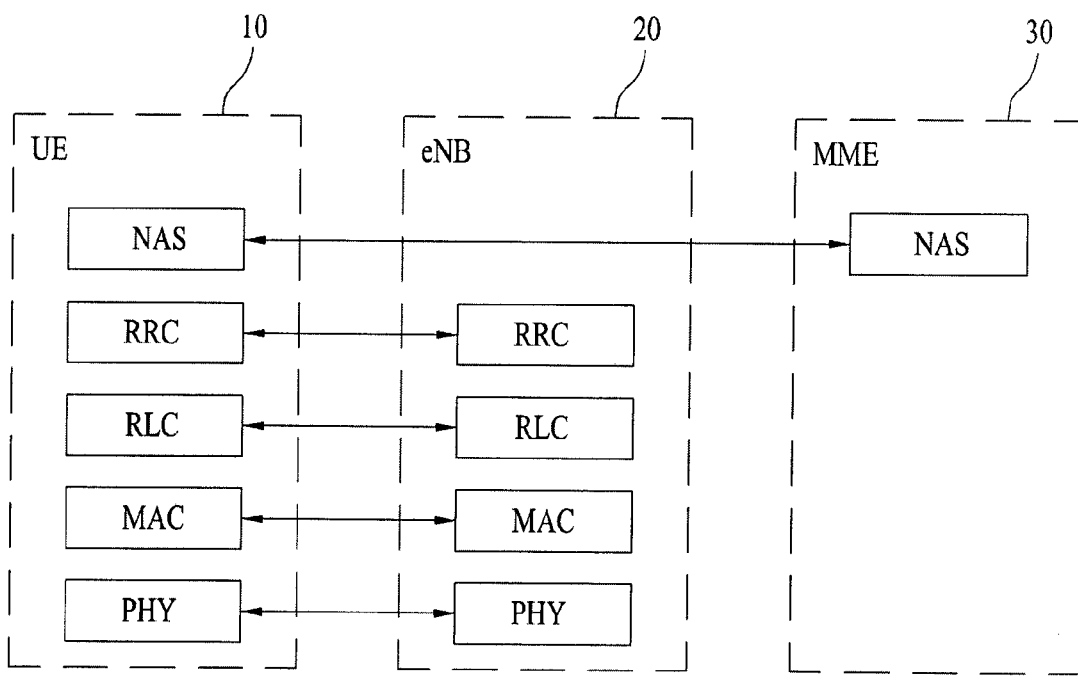

FIGS. 3a~3b illustrate the user-plane protocol and the control-plane protocol stack for the E-UMTS network. With reference to FIGS. 3a~3b, the protocol layers may be divided into a first layer (L1), a second layer (L2) and a third layer (L3) based upon the three lower layers of an Open System Interconnection (OSI) standard model.

The first layer L1 (or physical layer, PHY) provides an information transmission service to an upper layer using a physical channel. The physical layer is connected with a Medium Access Control (MAC) layer through a transport channel, and data between the MAC layer and the physical layer are transferred via the transport channel. Between different physical layers, namely, between physical layers of a transmission side and a reception side (for example, between physical layers of UE 10 and eNB 20), data are transferred via the physical channel.

The MAC layer of Layer 2 (L2) provides services to a Radio Link Control (RLC) layer via a logical channel. The RLC layer of Layer 2 (L2) supports a reliable transmission of data. Although the RLC layer is shown in FIGS. 3a~3b as being separate from the MAC layer, it is understood that the functions of the RLC layer may be performed by the MAC layer and that, therefore, a separate RLC layer may not be required. With reference to FIG. 3a, the Packet Data Convergence Protocol (PDCP) layer of Layer 2 (L2) performs a header compression function that reduces unnecessary control information such that data being transmitted by employing Internet Protocol (IP) packets, such as IPv4 or IPv6, can be efficiently sent over a radio (wireless) interface that has a relatively narrow bandwidth.

With reference to FIG. 3b, a Radio Resource Control (RRC) layer located at the lowest portion of the third layer (L3) is typically only defined in the control plane and controls logical channels, transport channels and the physical channels in relation to the configuration, reconfiguration, and release of the Radio Bearers (RBs). Here, the RB means a service provided by the second layer (L2) for data transmission between the terminal and the E-UTRAN.

With reference to FIG. 3a, the RLC and MAC layers (terminated in an eNB 20 on the network side) may perform functions such as scheduling, Automatic Repeat reQuest (ARQ), and Hybrid ARQ (HARM). The PDCP layer (terminated in eNB 20 on the network side) may perform functions such as header compression, integrity protection, and ciphering.

With reference to FIG. 3b, the RLC and MAC layers (terminated in an eNB 20 on the network side) perform the same or similar functions as for the control plane. The RRC layer (terminated in an eNB 20 on the network side) may perform functions such as broadcasting, paging, RRC connection management, RB control, mobility functions, and UE measurement reporting and controlling. The NAS control protocol (terminated in the MME 30 on the network side) may perform functions such as a SAE bearer management, authentication, LTE_IDLE mobility handling, paging origination in LTE_IDLE, and security control for the signaling between the gateway and UE 10.

The NAS control protocol may use three different states: a LTE_DETACHED state if there is no RRC entity; a LTE_IDLE state if there is no RRC connection while storing minimal UE information; and an LTE_ACTIVE state if the RRC connection is established.

Thus RRC state may be divided into two different states such as an RRC_IDLE state and an RRC_CONNECTED state.

In the RRC_IDLE state, the UE 10 may receive broadcasts of system information and paging information while the UE specifies a Discontinuous Reception (DRX) configured by NAS, and the UE has been allocated an identification (ID) (e.g., System Architecture Evolution-Temporary Mobile Subscriber Identity (S-TMSI)) which uniquely identifies the UE in a tracking area. In the RRC-IDLE state, no RRC context is stored in the eNB. In the RRC_IDLE state, the UE 10 specifies the paging DRX (Discontinuous Reception) cycle. Specifically, the UE 10 monitors a paging signal at a specific paging occasion of every UE specific paging DRX cycle.

In the RRC_CONNECTED state, the UE 10 has an E-UTRAN RRC connection and a RRC context is stored in the E-UTRAN, such that transmitting and/or receiving data to/from the network (eNB) becomes possible. Also, the UE 10 can report channel quality information and feedback information to the eNB. In RRC_CONNECTED state, the E-UTRAN knows the cell to which the UE 10 belongs. Therefore, the network can transmit and/or receive data to/from UE 10, the network can control mobility (handover) of the UE.

Figure 4:
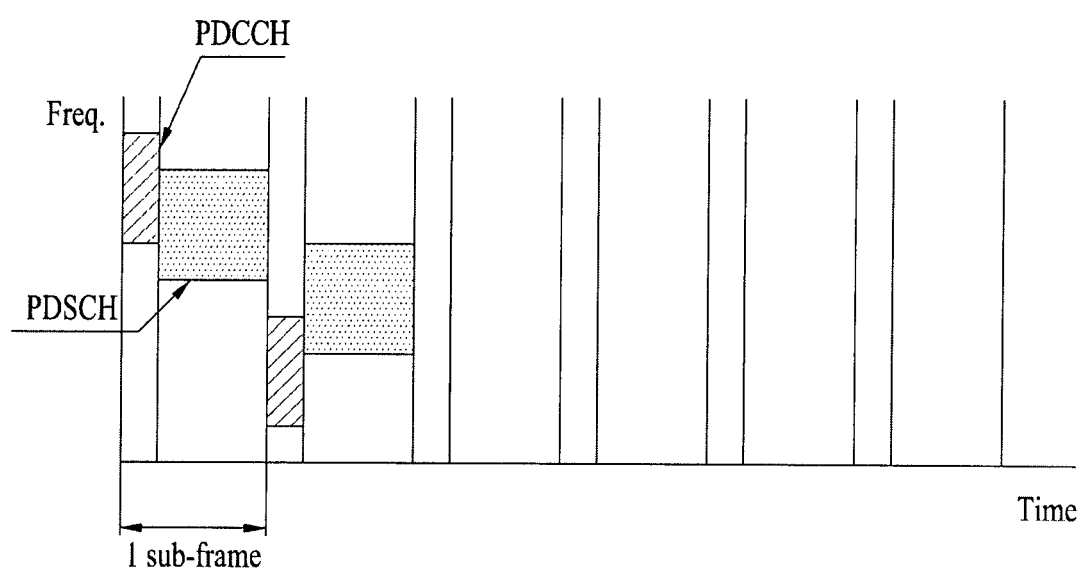
FIG. 4 illustrates a downlink subframe and physical channels.

FIG. 4 illustrates a downlink subframe and physical channels.

With reference to FIG. 4, the downlink subframe includes a plurality of slots (e.g., two). The number of OFDM symbols included in one slot may be changed according to the length of a Cyclic Prefix (CP). For example, in case of a normal CP, the slot may include seven OFDM symbols. The downlink subframe is divided into a data region and a control region in a time domain. A maximum of three (or four) OFDM symbols located in the front part of a first slot of the subframe may correspond to a control region to which a control channel is allocated. The remaining OFDM symbols correspond to a data region to which a Physical Downlink Shared Channel (PDSCH) is allocated. A variety of downlink control channels may be used in LTE(-A), for example, a Physical Control Format Indicator Channel (PCFICH), a Physical Downlink Control Channel (PDCCH), a Physical hybrid ARQ indicator Channel (PHICH), etc. The PCFICH is transmitted on the first OFDM symbol of the subframe, and carries information about the number of OFDM symbols used for transmitting control channels within the subframe. The PHICH carries a Hybrid Automatic Repeat reQuest Acknowledgment/Negative-Acknowledgment (HARQ ACK/NACK) signal as a response to an uplink transmission signal.

Control information transmitted via a PDCCH is referred to as Downlink Control Information (DCI). DCI includes resource allocation information for either an UE or an UE group and other control information. For example, DCI includes UL/DL scheduling information, an UL transmission (Tx) power control command, etc.

The PDCCH carries a variety of information, for example, transmission format and resource allocation information of a DownLink Shared Channel (DL-SCH), transmission format and resource allocation information of an UpLink Shared Channel (UL-SCH), paging information transmitted via a Paging Channel (PCH), system information transmitted via the DL-SCH, resource allocation information of an upper-layer control message such as a random access response transmitted via the PDSCH, a set of Tx power control commands of each UE contained in an UE group, a Tx power control command, activation indication information of Voice over IP (VoIP), and the like. A plurality of PDCCHs may be transmitted within a control region. An UE can monitor a plurality of PDCCHs. A PDCCH is transmitted as an aggregate of one or more contiguous Control Channel Elements (CCEs). The CCE is a logical allocation unit that is used to provide a coding rate based on a radio channel state to a PDCCH. The CCE may correspond to a plurality of Resource Element Groups (REGs). The format of PDCCH and the number of PDCCH bits may be determined according to the number of CCEs. A Base Station (BS) decides a PDCCH format according to DCI to be sent to the UE, and adds a Cyclic Redundancy Check (CRC) to control information. The CRC is masked with an identifier (e.g., Radio Network Temporary Identifier (RNTI)) according to a PDCCH owner or a purpose of the PDCCH. For example, provided that the PDCCH is provided for a specific UE, a CRC may be masked with an identifier of the corresponding UE (e.g., cell-RNTI (C-RNTI)). If PDCCH is provided for a paging message, a CRC may be masked with a paging identifier (e.g., Paging-RNTI (P-RNTI)). If a PDCCH is provided for system information (e.g., System Information Block (SIB)), a CRC may be masked with system Information RNTI (SI-RNTI). If PDCCH is provided for a random access response, a CRC may be masked with Random Access-RNTI (RA-RNTI). For example, CRC masking (or scrambling) may be performed using an exclusive OR (XOR) operation between CRC and RNTI at a bit level.

Figure 5:
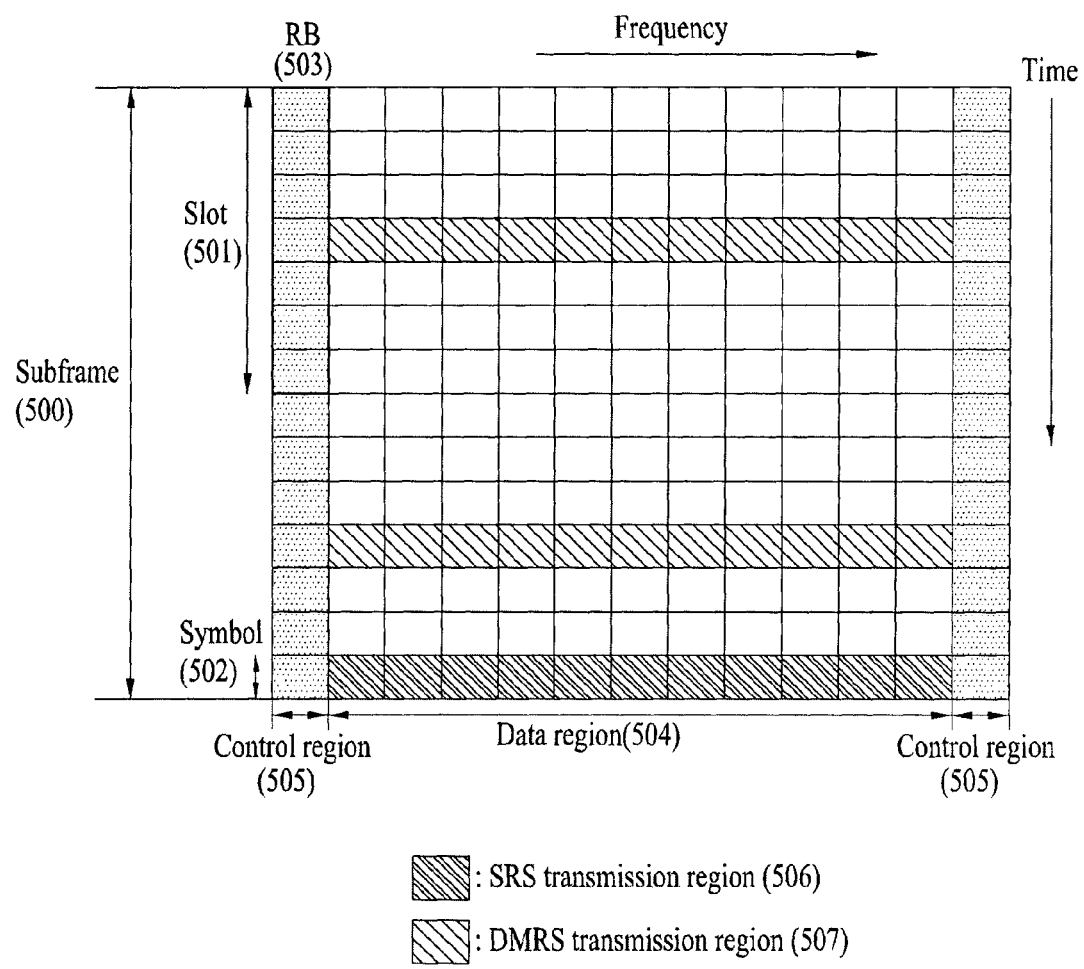
FIG. 5 illustrates a structure of an uplink subframe.

FIG. 5 is illustrates the structure of an uplink subframe.

With reference to FIG. 5, 1 ms subframe 500, which is a basic unit of uplink transmission of LTE/LTE-A, includes two 0.5 ms slots 501. Assuming that a normal Cyclic Prefix (CP) is configured, a slot includes 7 symbols 502 and one symbol corresponds to one SC-FDMA symbol. A resource block 503 is a resource allocation unit which corresponds to 12 subcarriers in the frequency domain and corresponds to one slot in the time domain. A structure of an uplink subframe is mainly divided into a data area 504 and a control area 505. The data area is a series of communication resources that are used to transmit data such as audio or a packet to each UE and corresponds resources other than the control area in the subframe. The control area is a series of communication resources that are used to transmit a report for downlink channel quality, an ACK/NACK to a downlink signal, an uplink scheduling request, or the like from each UE. A Sounding Reference Signal (SRS) is transmitted in the last SC-FDMA symbol of the subframe in a time domain and is transmitted through a data transmission band in a frequency domain.

Figure 6:
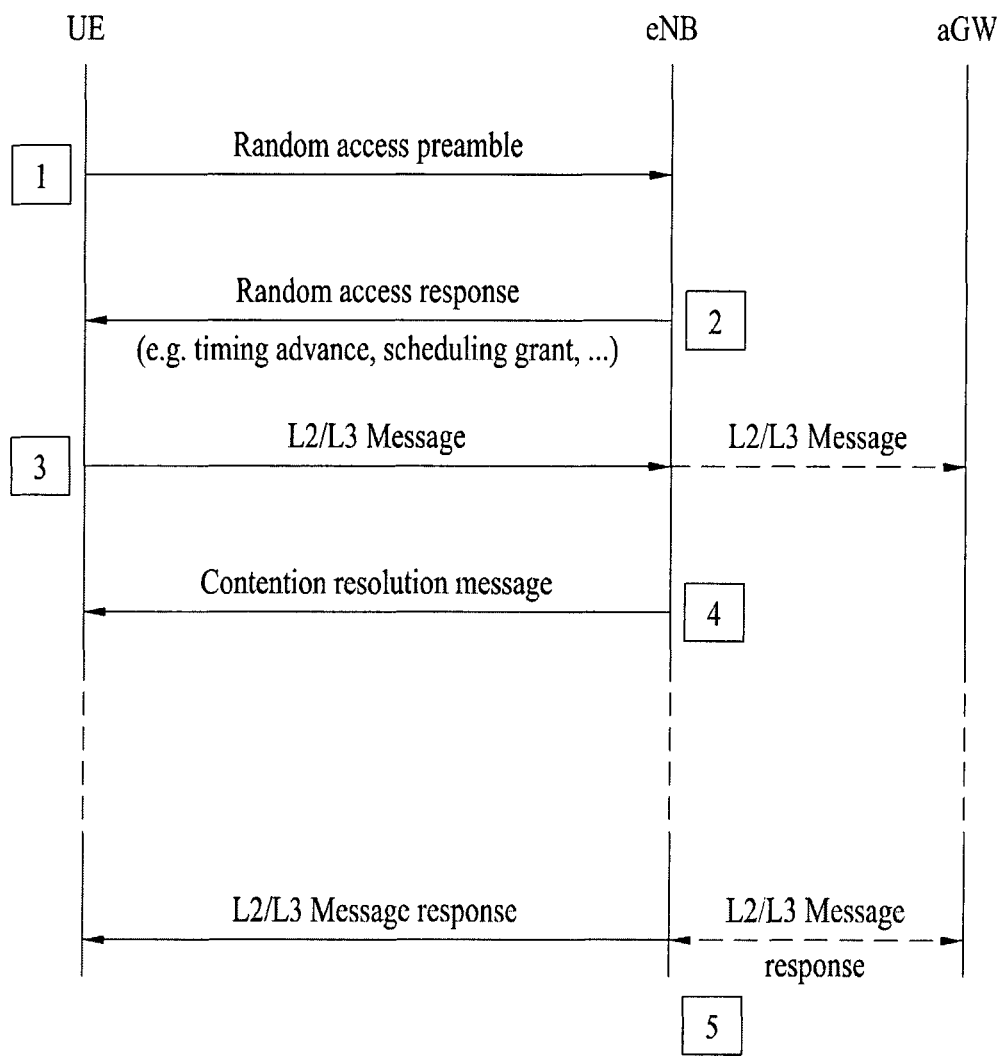
FIG. 6 illustrates a contention-based Random Access (RA) procedure.

FIG. 6 illustrates a contention-based random access procedure. The random access procedure is also referred to as a Random Access Channel (RACH) procedure. The RACH procedure can be used for several purposes. For example the RACH procedure can be used to access the network, to request resources, to carry control information, to adjust the time offset of the uplink in order to obtain uplink synchronization, to adjust transmission power, etc.

With reference to FIG. 6, firstly the UE retrieves information transmitted periodically from eNB on a downlink Broadcast Channel (BCH) and selects a preamble signature (e.g., Constant Amplitude Zero Auto-Correlation (CAZAC) sequence), a RACH time slot and a frequency band. The preamble signature is chosen by the UE from among a set of signatures known by the eNB. The UE generates a random access preamble (message 1, box 1) containing the chosen signature and transmits it to the eNB over the selected time slot at the selected frequency. The random access preamble is sent before a RACH connection request and indicates that the UE is about to transmit data. During the random access procedure, several UEs may share the same RACH channel (i.e., PRACH) and they are distinguished by preamble signatures. Congestions/collisions occur whenever several UEs choose the same signature and send it within the same time and frequency resources.

The eNB monitors the current RACH slot in an attempt to detect preambles transmitted from UEs in a corresponding cell. On reception of a signal, the eNB correlates the received signal in the RACH subframe with all possible signatures. Detection of the preamble can be either performed in the time domain or in the frequency domain. A detection variable is computed for each signature. If the detection variable exceeds a certain threshold, the preamble is considered detected.

The eNB sends a random access response (message 2, box 2) to acknowledge the successfully detected preambles. The random access response is sent via a downlink shared channel and includes the detected signature. The random access response also contains a timing advance command, a power-control command.

If the UE receives a random access response from the eNB, the UE decodes the random access response, adapts UL transmission timing and adapts UL transmission power if the random access response contains power control information. The UE then sends a resource request message (message 3, box 3) via an uplink shared channel. In the message 3, the UE requests bandwidth and time resources to transmit data and it also indicates an UE-specific identifier. When the UE requests resources, the UE uses a specific ID in the message 3 to resolve contentions. Then the UE monitors a specified downlink channel for response from the eNB. In the case of a positive resource grant, the subsequent transmissions are carried out as normal.

The eNB attempts to resolve any contentions. If the eNB receives a resource request with an UE-specific signature, the eNB checks how many UEs were detected with the same signature and resolves any possible contentions. If the preamble sent by an UE was in collision with a preamble from another UE, the eNB sends a contention resolution message (message 4, box 4) to command a corresponding UE to re-start the RACH procedure. If the UE was not in collision, the eNB sends a resource assignment message (message 5, box 5). Subsequent transmissions are carried out as usual.

Figure 7:
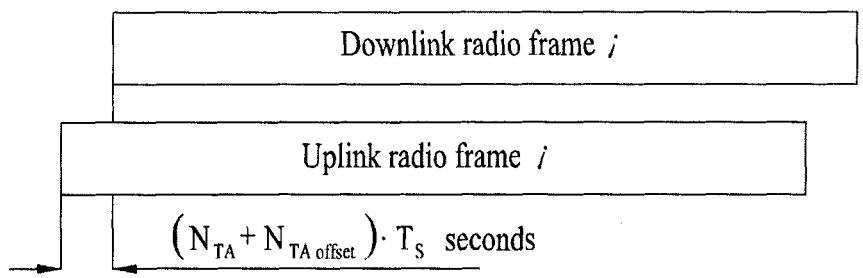
FIG. 7 illustrates an example of uplink-downlink timing relation.

FIG. 7 illustrates an example of uplink-downlink timing relation.

With reference to FIG. 7, transmission of the uplink radio frame number i from an UE may start $(N_{TA}+N_{TAoffset}) \times Ts$ seconds before the start of the corresponding downlink radio frame at the UE, where $0 \leq N_{TA} \leq 20512$, $N_{TAoffset}=0$ for FDD frame structure and $N_{TAoffset}=624$ for TDD frame structure. When $N_{TA}$ is indicated by a timing advance command, the UE may adjust a transmission timing of UL signals (e.g., PUCCH, PUSCH, SRS, etc.) by using $(N_{TA}+N_{TAoffset}) \times Ts$. UL transmission timing may be adjusted in units of a multiple of 16Ts. Ts represents a sampling time. A Timing Advance Command (or Timing Alignment Command) (TAC) in a random access response is 11-bits and indicates a TA value of 0, 1, 2, . . . , 1282, and $N_{TA}$ is given as $N_{TA}=TA*16$. Otherwise, a TAC is 6 bits and indicates a TA value of 0, 1, 2, . . . , 63, and $N_{TA}$ is given as $N_{TA,old}+(TA-31)*16$. A TAC received in subframe n is applied starting from subframe n+6.

Figure 8:
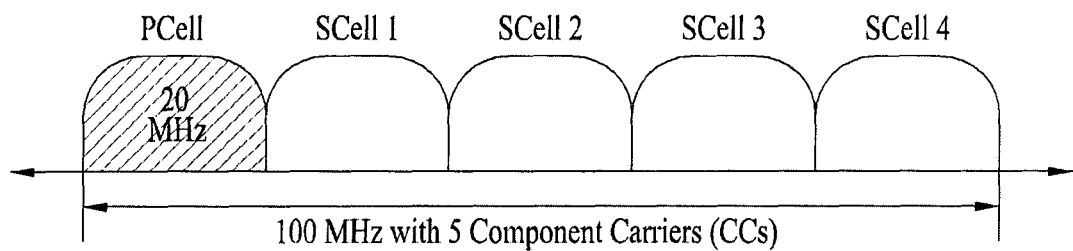
FIG. 8 illustrates an example of Carrier Aggregation (CA).

FIG. 8 illustrates an example of Carrier Aggregation (CA).

With reference to FIG. 8, in order to support wider transmission bandwidths, two or more carriers can be aggregated. Each of the aggregated carriers is referred to as a Component Carrier (CC). In term of CC view, LTE system may be understood as a system of one CC. An UE may simultaneously receive or transmit on one or multiple CCs depending on its capabilities. For example, LTE-A UE with capabilities for CA can simultaneously receive and/or transmit on multiple CCs corresponding to multiple cells. Meanwhile, a LTE UE can receive on a single CC and transmit on a single CC corresponding to one cell only. Here, a cell is a combination of downlink and optionally uplink resources. The CA is supported for both contiguous and non-contiguous CCs, in which each CC may be limited to a maximum of 20 MHz. When the CA is configured, the UE only has one RRC connection with the network. At RRC connection establishment/re-establishment/handover, one cell provides the NAS mobility information (e.g. Tracking Area Identity, TAI), and at RRC connection re-establishment/handover, one cell provides the security input. This cell may be referred to as a Primary Cell (PCell). In the downlink, the carrier corresponding to the PCell is the Downlink Primary Component Carrier (DL PCC) while in the uplink it is the Uplink Primary Component Carrier (UL PCC). Cell(s) other than PCell may be referred to as a Secondary Cell (SCell).

Depending on UE capabilities, SCells can be configured to form together with the PCell a set of serving cells. In the downlink, the carrier corresponding to a SCell is a Downlink Secondary Component Carrier (DL SCC) while in the uplink it is an Uplink Secondary Component Carrier (UL SCC).

Figure 9:
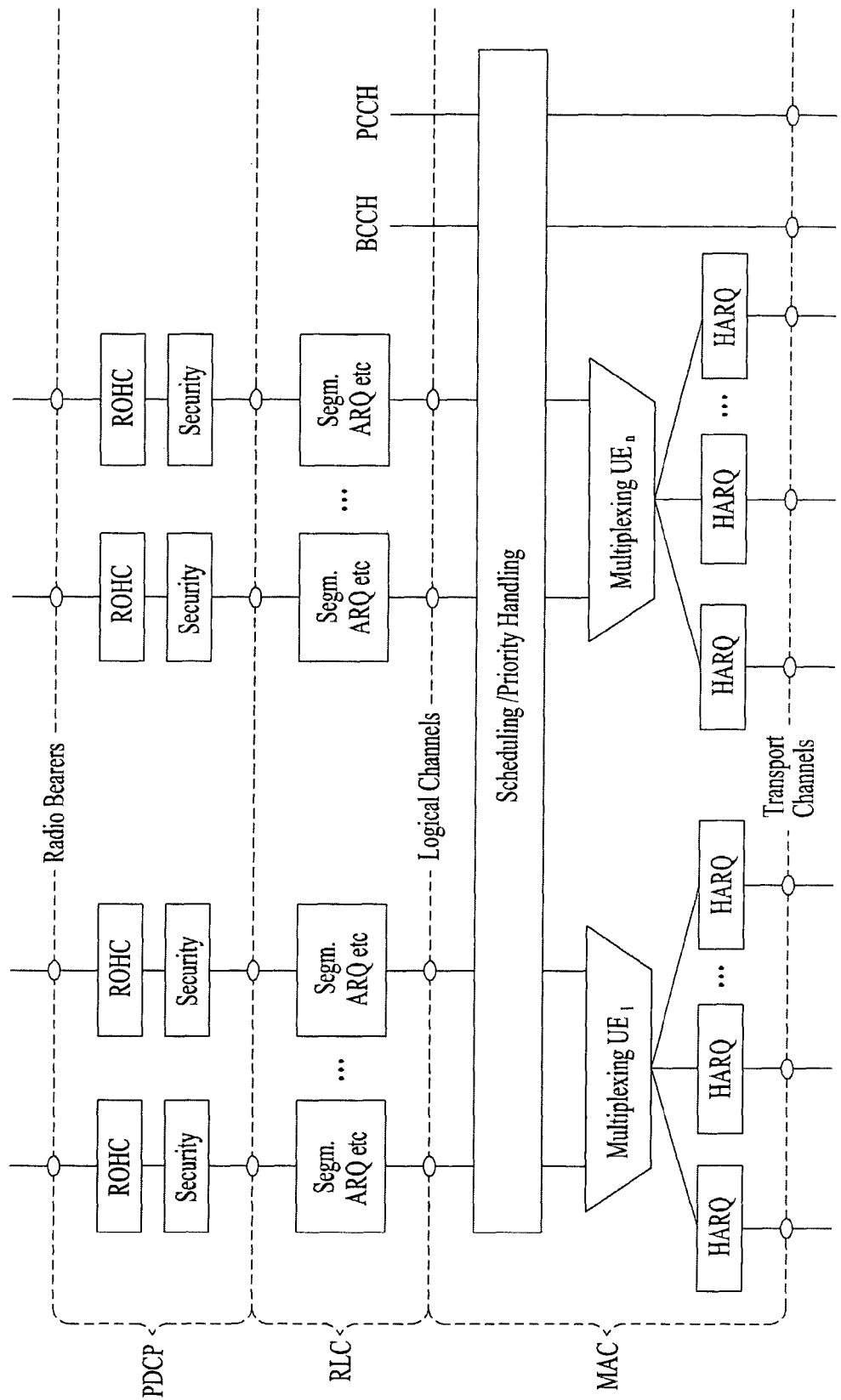
FIGS. 9-10 illustrate structures of protocol layer 2 for CA.
Figure 10:
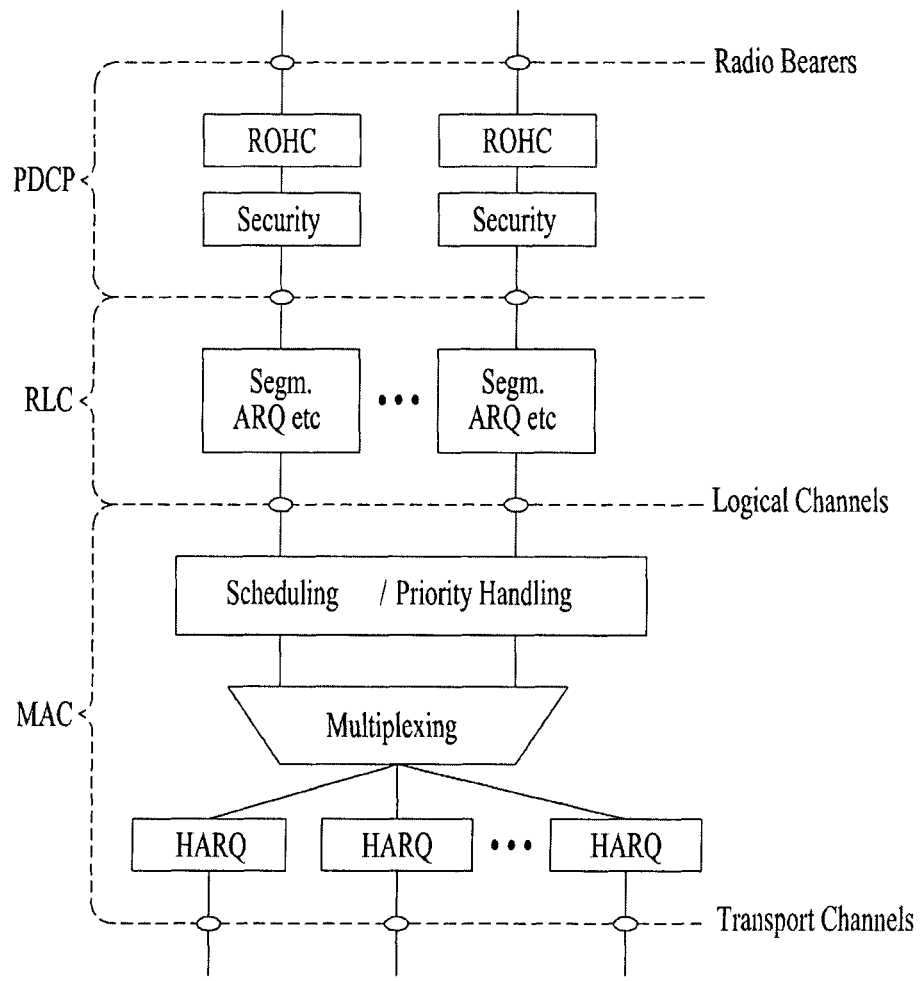

FIG. 9 illustrates a downlink structure of protocol layer 2 for CA. FIG. 10 illustrates an uplink structure of protocol layer 2 for CA. A CA scheme has many influences to the MAC layer in layer 2. For example, in the CA, plural CCs are used and one HARQ entity manages one CC, thus the MAC layer should be able to perform operations related with plural HARQ entities. In addition, each HARQ entity independently processes a Transport Block (TB), thus plural transport blocks may be transmitted and/or received in a same time.

In the CA, a network (particularly, BS) may add and release SCell(s) for an UE in accordance with the UE's traffic situation. In addition, in order to reduce overhead due to the addition and release of SCell(s), instead of newly configuring (e.g., adding and releasing) SCell(s) when it is needed, the network may activate and deactivate configured SCell(s), while PCell is always activated. Activation/deactivation of a SCell is explained below in detail.

If a SCell is deactivated: the UE
  not transmit SRS on the SCell;
  not report Channel Quality Indicator (CQI)/Precoding Matrix Index (PMI)/Rank Indicator (RI)/Precoding Type Indicator (PTI) for the SCell;
  not transmit on UL-SCH on the SCell;
  not monitor the PDCCH on the SCell;
  not monitor the PDCCH for the SCell.

The network activates/deactivates the SCell(s) by sending an Activation/Deactivation MAC Control Element (MAC CE).

Figure 11:
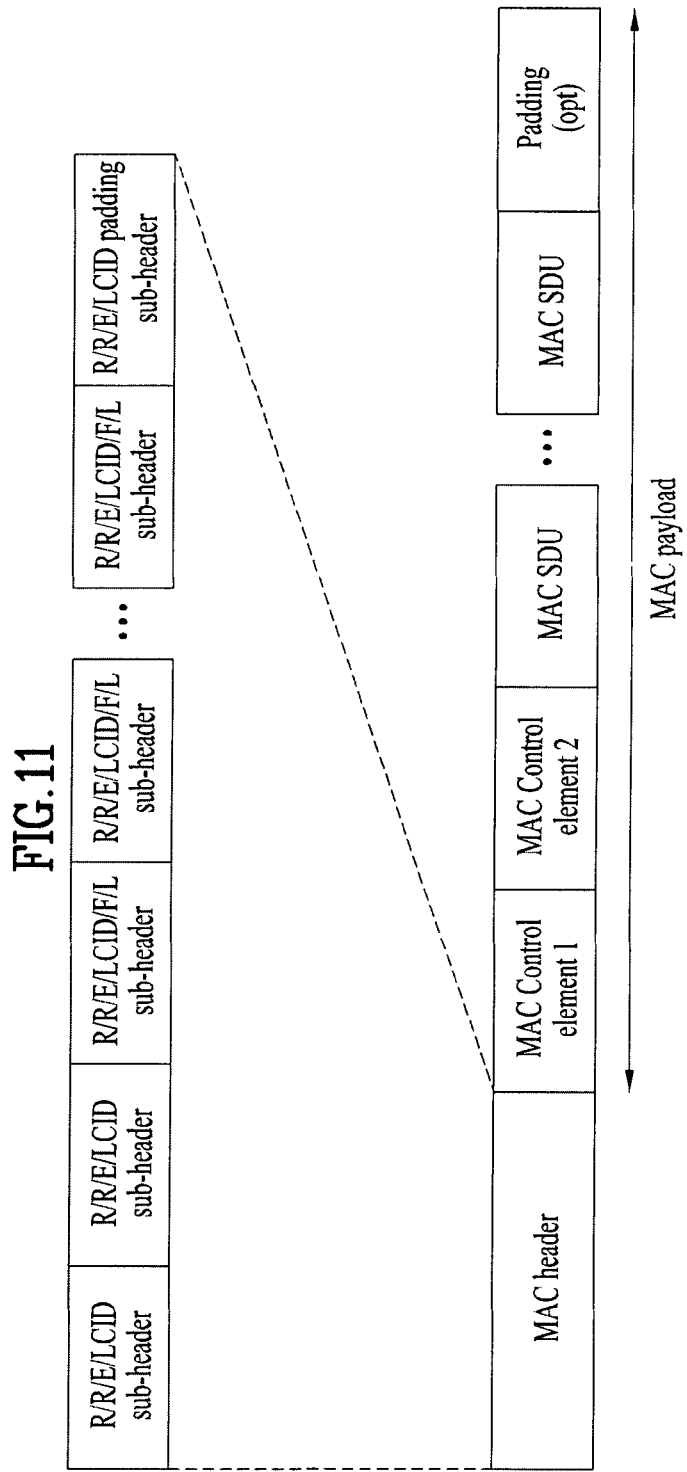
FIG. 11 illustrates a MAC PDU structure.

FIG. 11 illustrates a MAC PDU structure. A MAC PDU is transmitted via a Downlink Shared Channel (DL-SCH) and an Uplink Shared Channel (UL-SCH). A MAC PDU consists of a MAC header, zero or more MAC Service Data Units (MAC SDUs), zero, or more MAC Control Elements (MAC CEs), and optionally padding. MAC PDU subheaders have the same order as the corresponding MAC SDUs, MAC control elements and padding. MAC control elements are always placed before any MAC SDU.

Figure 12:
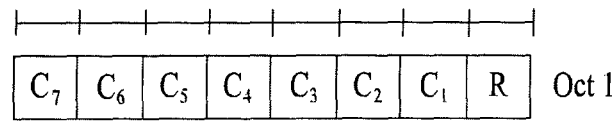
FIG. 12 illustrates an activation/deactivation MAC CE.

FIG. 12 illustrates an activation/deactivation MAC CE. The activation/deactivation MAC CE is identified by a MAC PDU subheader with Logical Channel Identifier (LCID) (e.g., LCID=11011) indicating activation/deactivation. The activation/deactivation MAC CE consists of a single octet containing seven C-fields and one R-field.

$C_i$: if there is an SCell configured with SCellIndex i, this field indicates the activation/deactivation status of the SCell with SCellIndex i, else the UE shall ignore the $C_i$ field. The $C_i$ field is set to "1" to indicate that the SCell with SCellIndex i shall be activated. The $C_i$ field is set to "0" to indicate that the SCell with SCellIndex i shall be deactivated; and
  R: Reserved bit, set to "0".

Meanwhile, when the network transmits an activation/deactivation command in order to deactivate SCell(s), the UE may miss the activation/deactivation command due to any reason such as radio conditions. In order to address this problem, the UE assumes that a SCell is in a deactivation state when the SCell has not been used for a certain time, instead of not maintaining activation state of a SCell. As an example, the UE may operate a secondary serving cell deactivation timer (e.g., sCellDeactivationTimer) per each configured SCell and deactivate an associated SCell upon its expiry. The timer value is configured per an UE; i.e., the same timer value applies for each SCell. The timer value may be indicated as a value in number of radio frames, e.g., {2 ms, 4 ms, 8 ms, 16 ms, 32 ms, 64 ms, 128 ms}. The timer value may be signaled by using a RRC message, in particular MAC configuration information for signaling and data radio bearers in the RRC message.

Configured SCell(s) is initially deactivated upon addition and after a handover.

The UE may for each Transmission Time Interval (TTI) and for each configured SCell:
  if the UE receives an Activation/Deactivation MAC CE in this TTI activating the SCell, the UE may in the TTI:
    activate the SCell; i.e. apply normal SCell operation including:
      SRS transmissions on the SCell;
      CQI/PMI/RI/PTI reporting for the SCell;
      PDCCH monitoring on the SCell;
      PDCCH monitoring for the SCell
    start or restart the sCellDeactivationTimer associated with the SCell;
  else, if the UE receives an Activation/Deactivation MAC CE in this TTI deactivating the SCell; or
  if the sCellDeactivationTimer associated with the activated SCell expires in this TTI:
    deactivate the SCell;
    stop the sCellDeactivationTimer associated with the SCell;
    flush all HARQ buffers associated with the SCell.
  if PDCCH on the activated SCell indicates an uplink grant or downlink assignment; or
  if PDCCH on the Serving Cell scheduling the activated SCell indicates an uplink grant or a downlink assignment for the activated SCell:
    restart the sCellDeactivationTimer associated with the SCell;
  if the SCell is deactivated:
    not transmit SRS on the SCell;
    not report CQI/PMI/RI/PTI for the SCell;
    not transmit on UL-SCH on the SCell;
    not monitor the PDCCH on the SCell;
    not monitor the PDCCH for the SCell.

Figure 13:
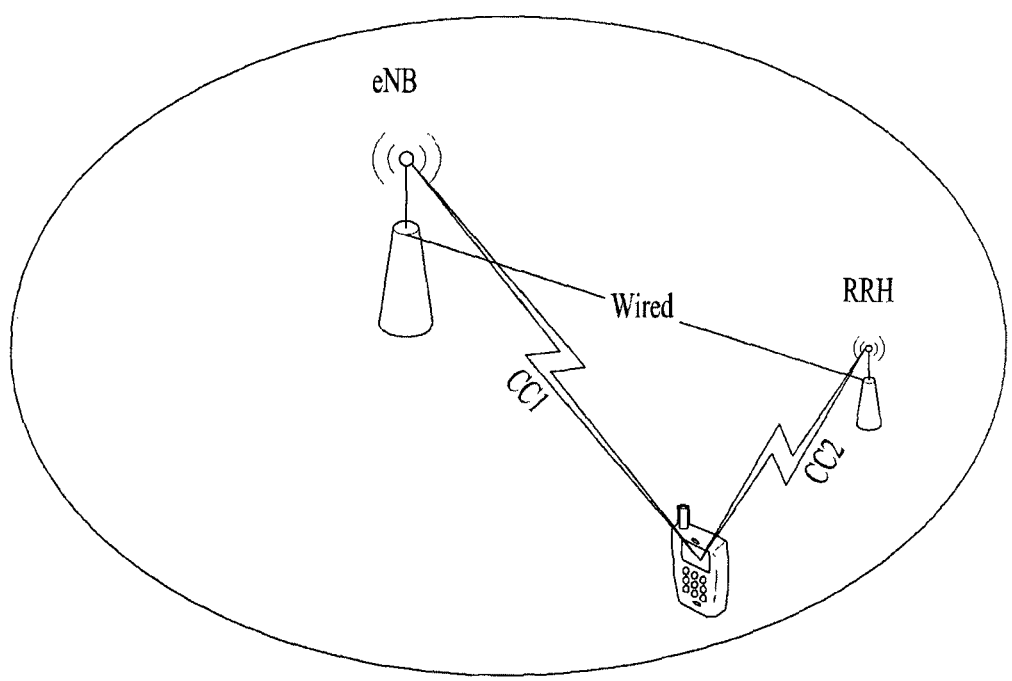
FIG. 13 illustrates an example that plural CCs with different frequency characteristics are aggregated.

FIG. 13 illustrates an example that plural CCs with different frequency characteristics are aggregated.

With reference to FIG. 13, an UE aggregates 2 CCs, one (CC1) of which communicates signals using an Remote Radio Header (RRH) (e.g., repeater) due to limited coverage, and the other one (CC2) of which directly communicates with a base station without the RRH. Thus, a propagation delay (or a reception timing at the base station) of UL signals, which are transmitted via CC1 from an UE, may be different from a propagation delay (or a reception timing at the base station) of UL signals, which are transmitted via CC2 from the UE. In this case, if plural serving cells try to transmit uplink signals without synchronizing transmission timing, interferences between cells may occur. Thus a plurality of time alignment managements may be needed.

Meanwhile, when the UE uses a plurality of serving cells, there may be serving cells showing similar timing synchronization characteristics. For example, serving cells in the same band may show similar timing synchronization characteristics. Thus, in the CA, in order to optimize a signal overhead due to adjusting a plurality of uplink timing synchronizations, serving cells showing similar timing synchronization characteristics may be managed as a group, which is called as a Timing Advance Group (TAG). To this end, at least one of serving cell(s) in a TAG should have an uplink resource, and serving cell(s) showing similar timing synchronization characteristics may belong to the TAG. For each serving cell, a base station may inform an UE of TAG assignment by using a TAG identifier in an RRC signal. The TAG identifier may be a value from 1 to a maximum number of TAGs that can be configured for an UE. An UE may be assigned two or more TAGs. If a TAG identifier indicates 0, it may mean a TAG including a PCell. For convenience, a TAG including the PCell is referred to a Primary TAG (pTAG), and another TAG(s) is referred to a Secondary TAG (sTAG). A secondary TAG identifier (sTAG-ID) may be used to indicate a corresponding sTAG of an SCell. If sTAG-ID is not configured for an SCell, the SCell may be configured a part of the pTAG.

EXAMPLE

Uplink Transmission Control in CA

As explained with reference to FIG. 7, a base station measures UE's transmission timing by using a random access preamble or a sounding reference signal, and inform the UE of adjusted timing value (i.e., TAC). The TAC is handled in a MAC layer. In addition, the UE does not exist in a fixed location, thus the UE's transmission timing continuously changes in accordance with a moving velocity of the UE, a location of the UE, etc. For this reason, when the UE receives the TAC from the base station, the UE assumes that the TAC is valid for a certain time. To this end, a Time Alignment Timer (TAT) is used. For example, the UE starts the TAT timer when the UE receives the TAC, and if the TAT expires, the UE prohibits uplink transmission except a random access preamble under assumption that uplink transmission timing is not aligned or synchronized. A value of the TAT may be received through system information or a RRC signal (e.g., a RRC connection reconfiguration message, a radio bearer reconfiguration message). If another TAC is received during the TAT is running, the UE restarts the TAT.

Table 1 shows a conventional MAC procedure for maintenance of uplink time alignment (3GPP 36.321 V10.5.0 (2012-03 5.2), section 5.2).

TABLE 1

The UE has a configurable timer timeAlignmentTimer which is used to control how long the UE is considered uplink time aligned.
The UE shall:
    when a Timing Advance Command MAC control element is received:
        apply the Timing Advance Command;
        start or restart timeAlignmentTimer.
    when a Timing Advance Command is received in a Random Access Response message:
        if the Random Access Preamble was not selected by UE MAC:
            apply the Timing Advance Command;
            start or restart timeAlignmentTimer.
        else, if the timeAlignmentTimer is not running:
            apply the Timing Advance Command;
            start timeAlignmentTimer;
            when the contention resolution is considered not successful, stop timeAlignmentTimer.
        else:
            ignore the received Timing Advance Command.
    when timeAlignmentTimer expires:
        flush all HARQ buffers;
        notify RRC to release PUCCH/SRS;
        clear any configured downlink assignments and uplink grants.
The UE shall not perform any uplink transmission except the Random Access Preamble transmission when timeAlignmentTimer is not running.

In a carrier aggregation, one pTAG and zero or more sTAGs can be configured as described with reference to FIG. 13, in which a TAC may be managed per a TAG. When the expiration of TAT is detected, UE operations may be different for pTAG and sTAG as shown below.

When a TAT for pTAG expires, an UE may perform following operations:
    flush HARQ buffers of all serving cells in the UE;
    notify RRC to release PUCCH/SRS (resources) of all serving cells in the UE;
    clear any configured downlink assignments and uplink grants.
    assume that all TATs in the UE are expired.

Figure 14:
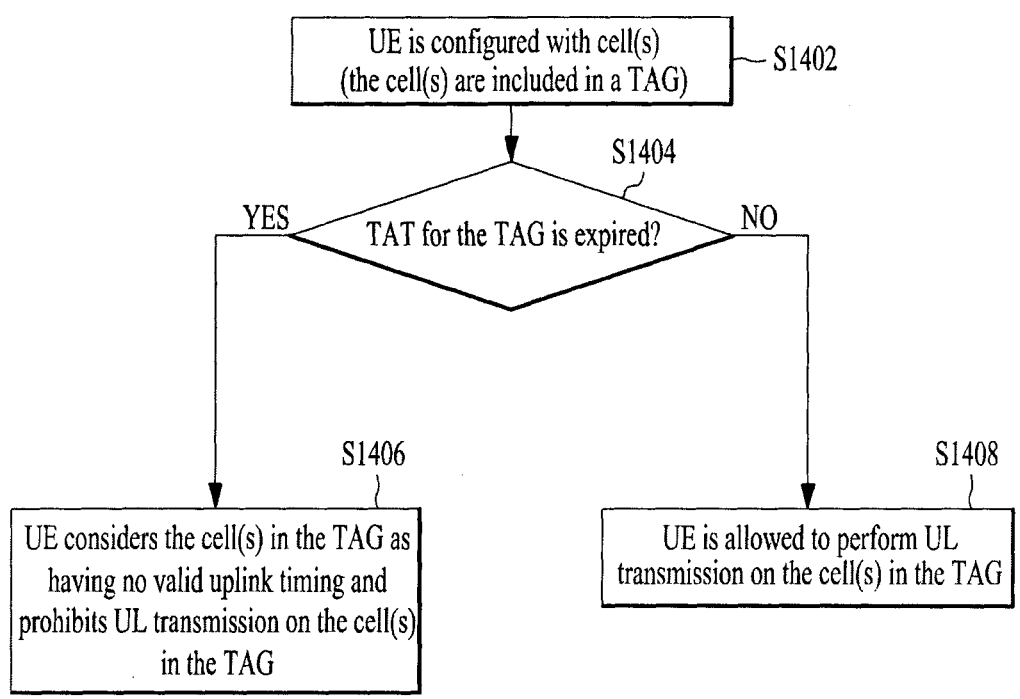
FIG. 14 shows a procedure for maintenance of uplink time alignment in accordance with the conventional arts.

Meanwhile, a TAT for sTAG expires, the UE may perform following operations:
    flush HARQ buffers of all serving cells in the sTAG;
    notify RRC to release SRS (resource) of all serving cells in the sTAG, FIG. 14 shows a procedure for maintenance of uplink time alignment in accordance with the conventional arts. Operations of FIG. 14 are corresponding to table 1.

With reference to FIG. 14, a UE is configured with cell(s) that are included in a TAG (S1402). When a TAC is received, the UE starts a TAT for the TAG and checks whether the TAT for the TAG include the cell(s) is expired (S1404). If the TAT for the TAG is expired, the UE considers the cell(s) included in the TAG as having no valid uplink timing and prohibits UL transmission on the cell(s) included in the TAG except a random access preamble transmission (S1408). In particular, as shown in table 1, the UE may flush all HARQ buffers, notify RRC to release PUCCH/SRS and clear any configured downlink assignments and uplink grants when the TAT expires. Meanwhile, if the TAT for the TAG is not expired, the UE is allowed to perform uplink transmission on the cell(s) included in the TAG (S1408).

In a carrier aggregation-based system, a base station may assign a secondary serving cell to an UE in consideration of traffic situation of the UE. In this regard, if there are plural TAGs, the base station may at first assign a proper TAG to the secondary serving cell in consideration of physical/geographic conditions of the secondary serving cell, but the TAG of the secondary serving cell may be needed to be changed later.

When changing the TAG of the (secondary) serving cell (hereinafter, new serving cell), the base station may assign a new TAG, whose TAT is not running, to the new serving cell. In this case, an UE shall not perform any uplink transmission except the random access preamble transmission for all serving cell (including the new serving cell) of the new TAG, but it is not guaranteed in accordance with the conventional arts.

Specifically, in the conventional arts, an UE carries out operations not to perform any uplink transmission except the random access preamble transmission only when a TAT expires. That is, as shown in Table 1, the UE flushes all HARQ buffers, notifies RRC to release PUCCH/SRS, and clears any configured downlink assignments and uplink grants, when the TAT expires. As a result, the UE cannot perform any uplink transmission except the random access preamble transmission when the TAT is not running. The conventional procedure does not cause any problem to old serving cell(s) in the TAG. However, if a new (secondary) serving cell is assigned from an old TAT (TAT is running) to a new TAG (TAT was expired), the UE could not carry out the operations not to perform any uplink transmission except the random access preamble transmission for the new serving cell of the new TAG, since the TAT of the new TAG was already expired. Thus there is no way to prevent the UE from performing any uplink transmission except the random access preamble transmission for the new serving cell of the new TAG (TAT is not running), in accordance with the conventional arts.

Figure 15:
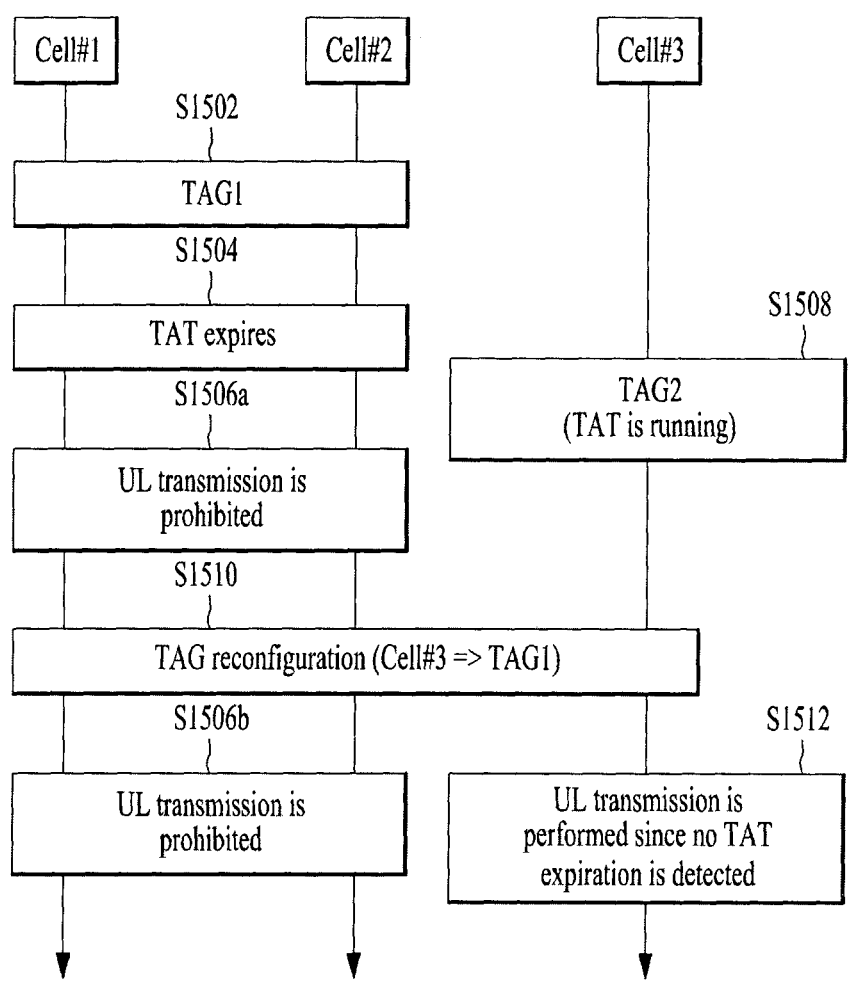
FIG. 15 illustrates an example of uplink transmission problem when a TAG change occurs in accordance with the conventional arts.

FIG. 15 illustrates an example of uplink transmission problem when a TAG change occurs in accordance with the conventional arts. For convenience, it is assumed that an UE is configured with three cells.

With reference to FIG. 15, cell#1 and cell#2 are assigned to a TAG#1 (S1502), and cell#3 is assigned to a TAG#2 (S1508). The TAG#1 may be pTAG or sTAG, and the TAG#2 may be pTAG or sTAG. The cell#3 may be a secondary serving cell. When a TAT of the TAG#1 expires (S1504), all serving cells of the TAG#1 are restricted in uplink transmission (S1506a~b). In particular, the UE shall not perform any uplink transmission except the random access preamble transmission for all serving cell of the TAG#1. To this end, for the all serving cell of the TAG#1, the UE may flush all HARQ buffers, notify RRC to release PUCCH/SRS, and clear any configured downlink assignments and uplink grants, when the TAT of the TAG#1 expires. Meanwhile, cell#3 is first assigned to the TAG#2 (TAT is running) (S1508), and re-assigned to the TAG#1 (S1510). In this case, there is no detected TAT expiration regarding the cell#3 or the TAG#1, uplink transmission of cell#3 can be normally performed even though all serving cells other than the cell#3 are restricted in uplink transmission (S1506a~b).

In order to address the above problems, the present invention proposes to consider that there is no valid uplink timing or uplink timing is not aligned and so restrict/prohibit uplink transmission of a serving cell when a TAT related with the serving cell (or a TAG to which the serving cell belongs) is not running (in addition to TAT expiration). To this end, an UE may carry out operations for restricting uplink transmission of the serving cell when the TAT related with the serving cell (or the TAG to which the serving cell belongs) is not running (in addition to TAT expiration). In particular, the UE may carry out operations not to perform any uplink transmission except the random access preamble transmission for the serving cell when the TAT related with the serving cell (or the TAG to which the serving cell belongs) is not running:

In the present invention, the serving cell may be a secondary serving cell. In addition, the TAG may be an old TAG of the serving cell or a newly assigned TAG of the serving cell.

Table 2 shows a proposed MAC procedure for maintenance of uplink time alignment.

TABLE 2

The UE has a configurable timer timeAlignmentTimer which is used to control how long the UE is considered uplink time aligned.
The UE shall:
    when a Timing Advance Command MAC control element is received:
        apply the Timing Advance Command;
        start or restart timeAlignmentTimer.
    when a Timing Advance Command is received in a Random Access Response message:
        if the Random Access Preamble was not selected by UE MAC:
            apply the Timing Advance Command;
            start or restart timeAlignmentTimer.
        else, if the timeAlignmentTimer is not running:
            apply the Timing Advance Command;
            start timeAlignmentTimer;
            when the contention resolution is considered not successful, stop timeAlignmentTimer.

TABLE 2-continued else:
        ignore the received Timing Advance Command.
    when timeAlignmentTimer expires or is not running:
        flush all HARQ buffers;
        notify RRC to release PUCCH/SRS;
        clear any configured downlink assignments and uplink grants.
The UE shall not perform any uplink transmission except the Random Access Preamble transmission when timeAlignmentTimer is not running.

The present invention can be applied only to a serving cell whose TAG is changed from an old TAG to a new TAG, i.e., a serving with a TAG change.

For the TAG change, the UE may receive a signal (e.g., RRC signal or MAC signal) including at least one of serving cell information and TAG information from a base station. For example, the signal used for the TAG change may include at least one of a secondary cell identifier (e.g., SCellIndex) and a TAG identifier (TAG ID). In this case, the present invention can be applied when a certain condition is satisfied. The certain condition may include: (1) the serving cell information indicates a serving cell which is already configured, and (2) the TAG information indicates a TAG which is different from a TAG of the serving cell indicated by the serving cell information. Thus, when the certain condition is satisfied, if a TAT of the TAG indicated by the TAG information is not running, the UE may restrict uplink transmission of the serving cell indicated by the serving cell information. But, when the certain condition is satisfied, if the TAT of the TAG indicated by the TAG information is running, the UE may perform uplink transmission of the serving cell indicated by the serving cell information.

Figure 16:
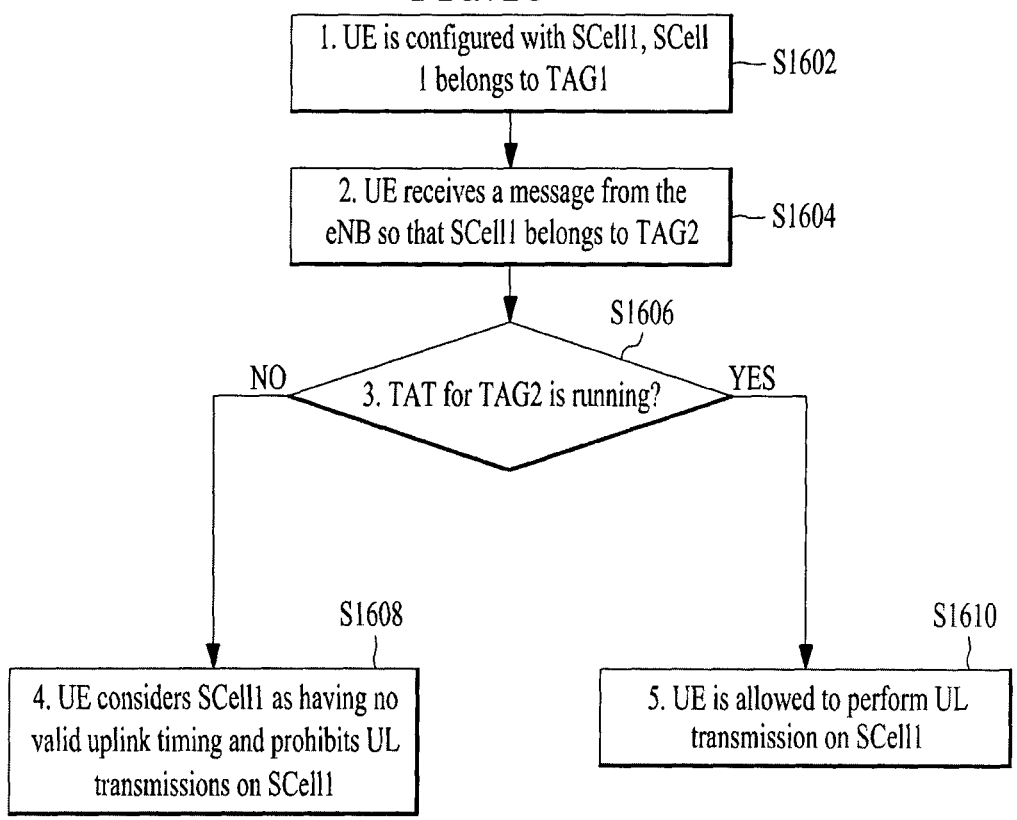
FIG. 16 illustrates an example of controlling uplink transmission in accordance with the present invention.

FIG. 16 illustrates an example of controlling uplink transmission in accordance with the present invention.

With reference to FIG. 16, a UE is configured with SCell#1, wherein SCell#1 belong to TAG#1 (S1602). Then the UE may receive a message from a base station, wherein the message is used to change TAG of SCell#1 from TAG#1 to TAG#2 (S1604). When the TAG of SCell#1 is changed, the UE may check whether a TAT for the TAG#2 is running or not (S1606). If the TAT for the TAG#2 is not running, the UE considers the SCell#1 as having no valid uplink timing and prohibits UL transmission on the SCell#1 except a random access preamble transmission (S1608). In particular, the UE may flush all HARQ buffers, notify RRC to release PUCCH/SRS and clear any configured downlink assignments and uplink grants, if the TAT for the TAG#2 is not running. Meanwhile, if the TAT for the TAG#2 is running, the UE is allowed to perform uplink transmission on the SCell#1 (S1610).

Figure 17:
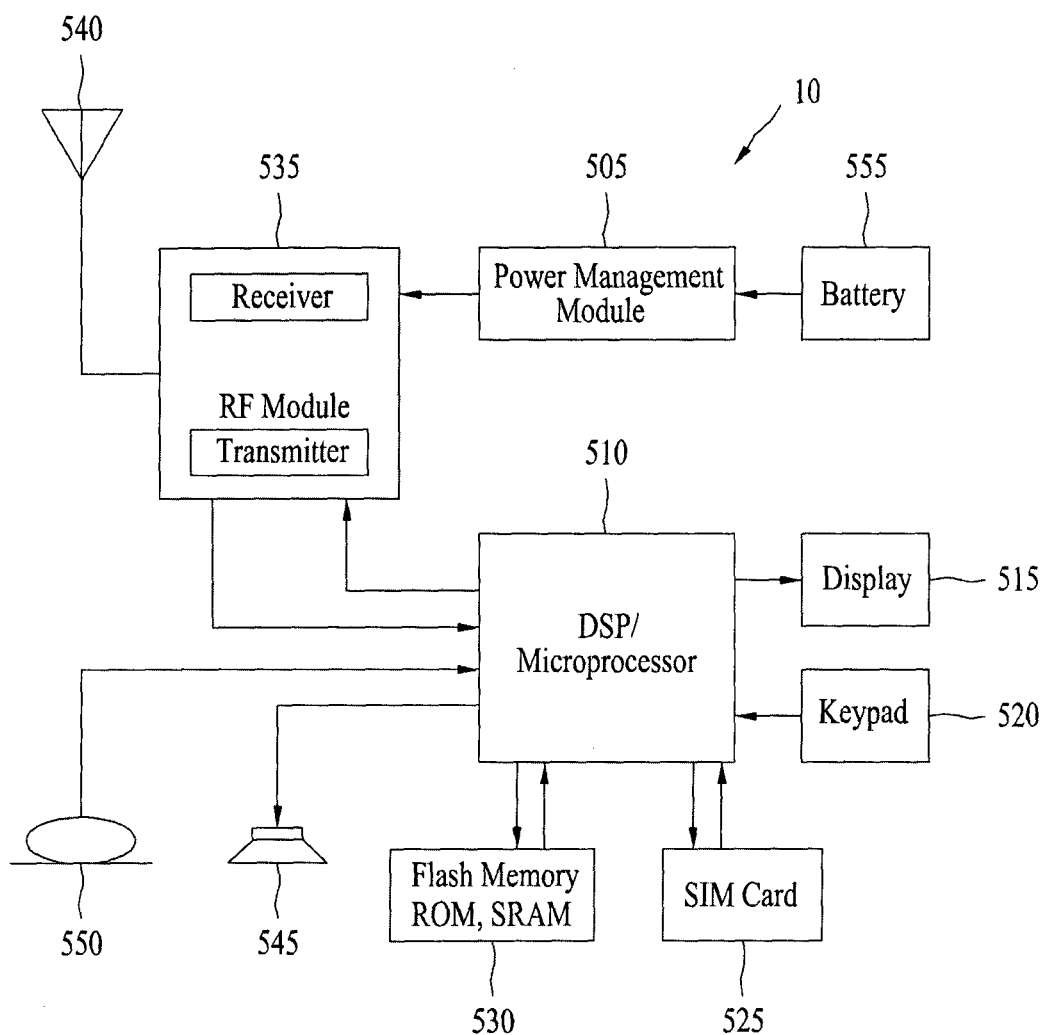
FIG. 17 illustrates a block diagram of a User Equipment (UE) or Mobile Station (MS).

FIG. 17 illustrates a block diagram of an UE or Mobile Station (MS) 10. The UE 10 includes a MTC device or a delay-tolerant device. The UE 10 includes a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF module 535, to initiate communication, for example, transmits radio signals comprising voice communication data. The RF module 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example. The processor 510 also includes the protocols and functions necessary to perform the various processes described herein.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and an UE. A specific operation which has been described as being performed by the eNB (or BS) may be performed by an upper node of the BS (or eNB) as the case may be. In other words, it will be apparent that various operations performed for communication with the UE in the network which includes a plurality of network nodes along with the BS (or eNB) can be performed by the BS or network nodes other than the BS (or eNB). The BS may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a method and an apparatus used for in a wireless communication system. The apparatus may include a user equipment, a base station, a relay, a repeater, and the like.

The invention claimed is:

1. A method of controlling uplink transmission at a user equipment configured with a Secondary Cell (SCell) belonging to a certain Timing Advance Group (TAG) in a wireless communication system, the method comprising:
    receiving a signal indicating that a TAG of the SCell is changed from the certain TAG to a newly assigned TAG;
    determining whether a Time Alignment Timer (TAT) of the newly assigned TAG is running or not when the TAG of the SCell is changed from the certain TAG to the newly assigned TAG; and
    considering the SCell as having no valid uplink timing if a the TAT of the newly assigned TAG is not running, even if a TAT of the certain TAG is running.

2. The method of claim 1, further comprising:
    flushing all Hybrid ARQ Repeat reQuest (HARQ) buffers if the TAT of the newly assigned TAG is not running.

3. The method of claim 2, further comprising:
    notifying an upper layer to release Physical Uplink Control Channel (PUCCH) resource and Sounding Reference Signal (SRS) if the TAT of the newly assigned TAG is not running.

4. The method of claim 3, further comprising:
    clearing any configured downlink assignment and uplink grant if the TAT of the newly assigned TAG is not running.

5. The method of claim 1, wherein the signal is a Radio Resource Control (RRC) signal or a Medium Access Control (MAC) signal.

6. A User Equipment (UE) configured with a Secondary Cell (SCell) belonging to a certain Timing Advance Group (TAG) and further configured to control uplink transmission in a wireless communication system, the UE comprising:
    a radio frequency (RF) module; and
    a processor, wherein the processor is configured to:
        receive a signal indicating that a TAG of the SCell is changed from the certain TAG to a newly assigned TAG;
        determine whether a Time Alignment Timer (TAT) of the newly assigned TAG is running or not when the TAG of the SCell is changed from the certain TAG to the newly assigned TAG; and
        consider the SCell as having no valid uplink timing if the TAT of the newly assigned TAG is not running, even if a TAT of the certain TAG is running.

7. The UE of claim 6, wherein the processor is further configured to:

flush all Hybrid ARQ Repeat reQuest (HARM) buffers if the TAT of the newly assigned TAG is not running.

8. The UE of claim 7, wherein the processor is further configured to:
notify an upper layer to release Physical Uplink Control Channel (PUCCH) resource and Sounding Reference Signal (SRS) if the TAT of the newly assigned TAG is not running.

9. The UE of claim 8, wherein the processor is further configured to:
clear any configured downlink assignment and uplink grant if the TAT of the newly assigned TAG is not running.

10. The UE of claim 6, wherein the signal is a Radio Resource Control (RRC) signal or a Medium Access Control (MAC) signal.

11. The method of claim 1, further comprising:
initiating a Random Access (RA) procedure on the SCell if the SCell is considered as having no valid uplink timing.

12. The method of claim 1, further comprising:
considering the SCell as having valid uplink timing and performing uplink transmission to the SCell if the TAT of the newly assigned TAG is running.

13. The UE of claim 6, wherein the processor is further configured to initiate a Random Access (RA) procedure on the SCell if the SCell is considered as having no valid uplink timing.

14. The UE of claim 6, wherein the processor is further configured to consider the SCell as having valid uplink timing and perform uplink transmission to the SCell if the TAT of the newly assigned TAG is running.

* * * * *